Patented Sept. 24, 1940

2,215,847

UNITED STATES PATENT OFFICE 2,215,847

COMPOSITION PREPARED FROM DEXTRINS

Hans F. Bauer, Chicago, Ill., assignor to Stein, Hall Manufacturing Company, Chicago, Ill., a corporation of Delaware No Drawing. Application November 25, 1936, Serial No. 112,693

12 Claims. (Cl. 134—23.4)

This invention relates to new and improved amylaceous compositions, more particularly new and improved film-forming compositions, which have adhesive properties, and a process for the preparation thereof. The invention further relates to dry base compositions which upon the addition of water give film-forming compositions.

This application is a continuation-in-part of my co-pending application Serial No. 87,015, filed June 24, 1936.

In my co-pending application various compositions were described and a number of examples of the preparation of such compositions were given containing all types of amylaceous materials, including undegenerated and degenerated or modified starches and dextrins. The undegenerated starches and some of the degenerated or modified starches ar practically insoluble or only slightly dispersible in water at ordinary temperatures and pressures. Hence, starch and starch derivatives which consist preponderantly of such substances will not form homogeneous suspensions by mixing with water at ordinary temperatures and pressures. The dextrins, however, will usually form a homogeneous suspension in water, although the translucence and transparence, that is, the clarity, of such substances may vary. In general, it may be stated that the commercial dextrins or substances consisting predominantly of commercial dextrins are much more soluble in water than the undegenerated or degenerated starches, or substances which are predominantly starchy in nature. While the low soluble dextrins somewhat resemble the starches in some of their characteristics, a distinction between starches and dextrins is fairly well recognized in the industry.

In the treatment of starchy materials which per se do not form a homogeneous gelatinous suspension in water at ordinary temperatures and pressures, it has been found in accordance with the invention described in my co-pending application that the addition of a urea in relatively large amounts will gelatinize said amylaceous substances in the presence of water under ordinary temperature and pressure conditions, without the addition of other auxiliary agents, such as oxidizing agents. The addition of urea in relatively large amounts to dextrins or carbohydrate substances consisting predominantly of dextrin is also described in my co-pending application and such addition is advantageous in serving to increase the transparence or clarity of the suspension. Urea, when added to dextrins, also serves the purpose of producing a more flexible film. This is true regardless of whether the dextrin is 100% soluble in water or only partially soluble, but if the dextrin is only partially soluble, the urea serves the purpose of increasing the solubility. With dextrins, or substances which are predominantly dextrins, it has been found that the amount of the urea required is not as large as in the case of starch materials, or substances which are predominantly starchy. Moreover, the urea seems to serve a somewhat different purpose when added to a dextrin, than when added to a starchy material.

In view of these distinctions, it is an object of the present invention to provide new and improved amylaceous compositions from dextrins or from amylaceous substances which preponderate in or contain a major proportion of dextrins. An additional object is to produce new and improved film-forming compositions. A further object is to produce compositions which are useful in coating and impregnating and sizing paper and which are adhesives for paper. Another object is the preparation of new and improved so-called seam gums and seal gums, which are useful in joining the backing seams of envelopes made from bond paper, and in producing the seals for such envelopes. Other objects of the invention are the preparation of compositions which will produce films that are clear, flexible, do not check or crack, will not discolor, do not tend to crystallize and are slightly hygroscopic. Other objects will appear hereinafter.

In accordance with the invention it has been found that new and improved amylaceous compositions may be prepared by bringing together a dextrin or amylaceous substance comprising a major proportion of a dextrin, a urea and water. No auxiliary agents are required, although in certain instances, it may be desirable to add auxiliary agents for various purposes, for instance, bleaching, inhibiting crystallization, filling, wetting, dispersing and the like. These compositions may be prepared in the form of dry base compositions containing only dry materials, including the dextrin and urea, and which, upon addition of water, produce gelatinous film-forming compositions.

The amount of the urea required to produce a composition which will form a flexible film is subject to variation, but in general will be much less than in the case of starches per se or amylaceous substances containing a major proportion of starches. With low soluble dextrins, the amount of urea required is usually more than with high soluble dextrins.

The mixing of the dextrin and urea may be carried out at ordinary temperatures and pressures, for example, in a vessel provided with an agitator. With increasing quantities of the urea, a noticeable effect on the clarity or transparency of the composition may be observed. With relatively small amounts of urea, heating of the mixture may be desirable, particularly with the low soluble dextrins. The amount of water present may vary depending upon the intended use of the resultant composition, but should be at least sufficient to wet the mixture, that is, to produce a homogeneous dispersion. The addition of urea and/or water may be made to increase the fluidity of the mixture as desired.

In many instances, for instance in preparing envelope adhesives, it is desirable to add a substance to the mixture which is adapted to inhibit or prevent the crystallization of the urea in the dry film and which will give the dry film formed from the resultant composition a glossy appearance.

The invention will be further illustrated but is not limited by the following examples, in which the quantities are stated in parts by weight:

Example I

A composition was prepared by mixing together 20.5 parts of urea, 10.5 parts of sodium acetate, 68 parts of white tapioca dextrin about 40% to 45% water soluble, 1 part of sodium bisulfite, and 41 parts of water, at a temperature of 165° F. A fluid mixture having good adhesive properties was obtained.

Example II

A composition was prepared by mixing together 18.5 parts of urea, 6 parts of sodium acetate, 15 parts of tapioca dextrin of the type described in Example I, 60 parts of Elight dextrin, a highly soluble light yellow tapioca dextrin capable of taking up about 0.6 part of water per part of dextrin, 0.5 part of sodium bisulfite and 30 parts of water. This mixture was heated at 165° F. until a gelatinous composition of fluid consistency was obtained. The product possessed good glue and adhesive properties.

Example III

A composition was prepared by mixing together 100 parts of the highly soluble yellow tapioca dextrin described in Example II, 25 parts of tapioca dextrin of the type described in Example I, 30 parts of urea, 10 parts of sodium acetate, 1 part of sodium perborate and 50 parts of water. The mixture was heated to a temperature of 165° F. in about ten minutes and allowed to cool normally. The resultant product possessed good adhesive and film-forming properties.

Example IV

A composition was prepared by mixing together 62.5 parts of the white corn dextrin 14% to 15% soluble in water, 25 parts of urea, 12.5 parts of sodium acetate, 0.25 part of citric acid and 32 parts of water. This mixture was heated to a temperature of 175° F. and allowed to cool normally. The resultant product was found to be useful as a seam gum for sealing seams of bond envelopes.

Example V

A composition was prepared in a manner similar to that described in Example IV, except that 62.5 parts of a 25% water soluble dextrin were substituted for the 62.5 parts of the white corn dextrin. Good results were obtained with the resultant composition when used as a seam gum.

Example VI

The following compositions were prepared by mixing the ingredients together as shown in the various columns listed below:

| | Corn dextrin 25% soluble | Urea | Sodium acetate | Citric acid | Water |
|---|---|---|---|---|---|
| 1 | 71.5 | 28.5 | | | 35.7 |
| 2 | 63 | 32 | 5 | 0.25 | 30 |
| 3 | 70 | 24 | 6 | | 30 |

These compositions were all prepared by mixing the ingredients at room temperature until a homogeneous gelatinous mass was obtained and then allowing them to stand over night. They produced good films on various types of paper including bond paper and were found to be useful as tacking or similar gums for bond envelopes.

Example VII

A blend was prepared by mixing together about 92% of a 85% to 100% soluble tapioca dextrin and about 8% urea. This dry base or blend was then mixed with water in proportions corresponding to 16 gallons of water to 200 pounds of blend or base and heated to 140° F. in about ten to fifteen minutes and then allowed to cool normally. An excellent seal gum for envelopes was obtained. This is especially useful in the plunger type of envelope machine. For the rotary type of envelope machine, the same blend was mixed with water in the proportion of 19 gallons water to 200 pounds of blend.

Example VIII

A dry base composition was prepared by mixing together 91.5% of 85% to 100% soluble tapioca dextrin, 7.5% urea and 1% sodium perborate. This blend was mixed with water in proportions corresponding to 200 pounds of blend to 16 gallons of water and heated to 140° F. in the course of about ten to fifteen minutes and then allowed to cool normally. The resultant mixture was found to be very suitable as a seal gum for the plunger type of envelope machine. For the rotary type of envelope machine, a similar mixture was made, except that the amount of water employed was 19 gallons to 200 pounds of blend.

The sodium perborate in this example serves as a bleaching agent.

Example IX

A dry base composition was prepared by mixing together a blend of 60% highly soluble tapioca dextrin (99.5% soluble), 32.5% of another highly soluble tapioca dextrin (99.5% soluble), 5% of urea and 2.5 of thiourea. This blend was then mixed with water in the proportions of 100 parts of blend to 50 parts of water. A seal gum was obtained having good adhesive properties, particularly characterized by a higher gloss, apparently due to the presence of the thiourea.

Example X

A blend was prepared by mixing together 125 parts of white tapioca dextrin (10% soluble in cold water) and 75 parts of urea. This blend was then mixed with 100 parts of water at ordinary temperatures and pressures and produced an adhesive which gave very good results in the plunger type of envelope machine.

Example XI

A dry base composition was prepared by mixing together 89.5% of a canary dextrin which was about 100% soluble with 8.5% urea and about 2% sodium perborate. Two hundred pounds of the blend was mixed with 16 gallons of cold water to produce a light colored seal gum which had excellent re-tacking properties.

Example XII

A dark colored seal gum was prepared in a manner similar to that described in Example XI by mixing 92.5% of a highly soluble tapioca dextrin with 7.5% urea and stirring the resultant blend with cold water in proportions of 200 pounds of blend to 16 gallons of water. Except for the color, this gum was similar to the gum described in Example XI.

The following example will illustrate the effect of increasing quantities of urea on the viscosity of a dextrin composition.

Example XIII

The following compositions were prepared by mixing together the ingredients shown in the various columns listed below:

| | Tapioca dextrin 12% soluble | Urea | Thiourea | Water | Viscosity cc. per minute | Appearance after 24 hours |
|---|---|---|---|---|---|---|
| 1 | 125 | | | 125 | 2 | Stiff paste. |
| 2 | 125 | 6.25 | | 125 | 3.5 | Do. |
| 3 | 125 | 12.5 | | 125 | 3.5 | Do. |
| 4 | 125 | 25 | | 125 | 6 | Do. |
| 5 | 125 | 37.5 | | 125 | 9 | Do. |
| 6 | 125 | 50 | | 125 | 13 | Flows. |
| 7 | 125 | 62.5 | | 125 | 16 | Do. |
| 8 | 125 | | 62.25 | 125 | 5.5 | Paste. |
| 9 | 125 | 12.5 | | 125 | 10.5 | Very stiff liquid. |
| 10 | 125 | | 25 | 125 | 15 | Flows freely. |
| 11 | 125 | | 37 | 125 | 19.5 | Do. |
| 12 | 125 | | 62.5 | 125 | 16 | Do. |

The solid ingredients, dextrin and the carbamide, were mixed dry, water added, pasted and heated to 180° F. and then allowed to cool normally to 66° F., and the viscosity determined by allowing the resultant composition to flow through an orifice which would permit a flow of 400 ccs. of water per minute under similar conditions. The appearance of the various compositions after 24 hours is noted in the table. No precipitation of crystals in the urea compositions occurred. However, some precipitation of solid thiourea did occur in compositions 11 and 12.

Example XIV

The following compositions were prepared by mixing together the ingredients shown in the various columns listed below:

| | Chlorinated starch | Dextrin* | Urea | Sodium acetate | Water | Characteristics of product | | |
|---|---|---|---|---|---|---|---|---|
| | | | | | | Gloss | Fluidity | Coating |
| 1 | 50 | 80 | 50 | 20 | 60 | Gloss | Does not flow | Good. |
| 2 | 40 | 80 | 50 | 20 | 60 | Good gloss | do | Do. |
| 3 | 30 | 80 | 50 | 20 | 60 | Gloss | do | Fair. |
| 4 | 20 | 80 | 50 | 20 | 60 | Slight gloss | Flows some | Thin. |
| 5 | 10 | 80 | 50 | 20 | 60 | None | Flows freely | Do. |
| 6 | 15 | 80 | 50 | 20 | 60 | Slight | do | Do. |

*A white corn dextrin product which is about 25% to 30% water soluble.

These compositions were all prepared by mixing the ingredients at room temperature for about ten to fifteen minutes until a homogeneous gelatinous mass was obtained and then allowing them to stand over night.

The consistency of these compositions was observed at regular intervals for two weeks. Compositions 1, 2 and 3 were too heavy to flow at all times. Composition 4 would barely flow at room temperature of 72° F. for the first six days and after standing for two weeks would not flow. Composition 5 flowed freely, spread very freely and penetrated more than the others of the series. Composition 6 flowed freely and spread easily.

Strips of bond paper (made from 100% rag) were sealed together with each of the six compositions and left in an oven at a temperature of 210° F. for 96 hours. All of the seals were colorless and had firm bonds. Films of the composition were dried at room temperature upon glass. The gloss effect was determined by allowing the compositions to dry on bond paper for 24 hours.

Example XV

The following compositions were prepared by mixing together the ingredients shown in the various columns listed below:

| | Chlorinated starch | Dextrin* | Urea | Sodium monophosphate | Water | Characteristics of product | |
|---|---|---|---|---|---|---|---|
| | | | | | | Gloss | Fluidity |
| 1 | 30 | 80 | 50 | 20 | 60 | Dull | Does not flow. |
| 2 | 30 | 80 | 50 | 24 | 60 | do | Do. |
| 3 | 30 | 80 | 50 | 10 | 60 | Slight | Do. |
| 4 | 30 | 80 | 50 | 15 | 60 | do | Do. |

*Same as in Example XIV.

The compositions were prepared according to the procedure of Example XIV and the tests for gloss and fluidity were similar to those of Example XIV. Films of the compositions dried on watch glass showed no crystallization after a week. Strips of standard bond paper sealed with these compositions and dried as in Example XIV for 96 hours had good bond and showed no yellow discolorations.

Example XVI

The following compositions were prepared by mixing together the ingredients shown in the various columns listed below:

| | Chlorinated starch | Dextrin* | Urea | Sodium acetate | Water |
|---|---|---|---|---|---|
| 1 | 10 | 80 | 34 | 20 | 60 |
| 2 | 10 | 80 | 34 | 10 | 60 |

*Same as in Example XIV.

These compositions were prepared in a manner similar to that described in Example XIV. Composition 1 flowed freely and spread easily. Composition 2 flowed after six days, but did not flow after standing for two weeks. Films of both compositions on glass were tough but not as hard or crystalline as the compositions of Example XIV. Strips of standard bond paper sealed with these compositions as in Example XIV had a good bond after being in the oven for 96 hours.

*Example XVII*

The following compositions were prepared by mixing together the ingredients shown in the various columns listed below:

|   | Chlorinated starch | Dextrin* | Urea | Ammonium chloride | Citric acid | Water | Characteristics of product, fluidity |
|---|---|---|---|---|---|---|---|
| 1 | 10 | 80 | 34 | 19 | 1 | 60 | Flows freely. |
| 2 | 10 | 80 | 34 | 10 | 0.5 | 60 | Flows. |
| 3 | 10 | 80 | 34 | 20 | 0 | 60 | Flows freely. |
| 4 | 20 | 80 | 50 | 19 | 1 | 60 | Flows, spreads well. |
| 5 | 20 | 80 | 34 | 19 | 1 | 60 | Does not flow. |
| 6 | 20 | 80 | 34 | 19 | 1 | 70 | Flows. |

*Same as in Example XIV.

These compositions were prepared by mixing together the ingredients as in Example XIV and tests were similarly conducted. All of the compositions flowed except No. 5 which was too heavy to flow even when hot. The entire series of compositions produced only a slight gloss on bond paper after drying 24 hours. Films on glass made with this series showed a needle-like crystallization. Composition 4 had much larger crystals than the others. Crystal formation, however, did not destroy adhesion. All of the films showed a decided tendency to be hygroscopic in relatively high humidities. Strips of standard bond paper sealed with compositions of this series and dried as in Example XIV for 96 hours had a very firm bond.

*Example XVIII*

The following compositions were prepared by mixing together the ingredients shown in the various columns listed below:

|   | Chlorinated starch | White tapioca dextrin* | Urea | Sodium acetate | Water | Characteristics of product, fluidity |
|---|---|---|---|---|---|---|
| 1 | 50 | 80 | 50 | 20 | 60 | Flows. |
| 2 | 40 | 80 | 50 | 20 | 60 | Flows easily. |
| 3 | 30 | 80 | 50 | 20 | 60 | Flows freely. |
| 4 | 20 | 80 | 50 | 20 | 60 | Flows easily. |

*35.1% soluble in water.

These compositions were prepared by mixing the foregoing ingredients as in Example XIV.

Composition 1 flowed but was more difficult to spread than the compositions of Example XVII. Composition 2 was easier to spread than composition 1. Composition 3 spread very easily. The entire series produced a good gloss when dried on standard bond paper for 24 hours. Films made on gloss could be scratched with the finger nail and showed pearl-like crystallization. However, a good film was obtained. Strips of bond paper sealed with compositions of this series and dried in a steam-heated oven for 96 hours had a very good bond.

*Example XIX*

The following compositions were prepared by mixing together the ingredients shown in the various columns listed below:

|   | Chlorinated starch | White tapioca dextrin* | Urea | Sodium acetate | Water | Characteristics of product, fluidity |
|---|---|---|---|---|---|---|
| 1 | 50 | 80 | 34 | 20 | 60 | Flows well. |
| 2 | 50 | 80 | 34 | 10 | 60 | Barely flows. |
| 3 | 40 | 80 | 34 | 10 | 60 | Flows. |
| 4 | 40 | 80 | 34 | 5 | 60 | Do. |
| 5 | 30 | 80 | 34 | 10 | 60 | Do. |
| 6 | 40 | 80 | 25 | 10 | 60 | Does not flow |

*35.1% soluble in water.

These compositions prepared as in Example XIV showed the effect of using less urea and sodium acetate. Compositions 1 to 5 flowed. However, composition 2 barely flowed after six days and did not flow after standing 10 days. Composition 6 did not flow at 82° F. All of these compositions made good transparent films on glass with no decided crystallization. Films of the compositions made on standard bond paper and dried for 24 hours all had a good gloss except No. 6 which had only a fair gloss and a tendency to check. Strips of bond paper sealed with compositions of this series and dried in a steam oven for 96 hours had good bonds and showed no discoloration.

*Example XX*

The following compositions were prepared by mixing together the ingredients shown in the various columns listed below:

|   | Chlorinated starch | White tapioca dextrin* | Urea | Ammonium chloride | Citric acid | Water | Characteristics of product, fluidity |
|---|---|---|---|---|---|---|---|
| 1 | 10 | 80 | 34 | 19 | 1 | 60 | Thin. |
| 2 | 20 | 80 | 34 | 19 | 1 | 60 | Do. |
| 3 | 10 | 80 | 34 | 19 | 0 | 60 | Flows very freely. |
| 4 | 20 | 80 | 50 | 20 | 1 | 60 | Flows. |
| 5 | 20 | 80 | 34 | 19 | 0 | 60 | Do. |
| 6 | 20 | 80 | 34 | 19 | 1 | 50 | Do. |
| 7 | 40 | 80 | 34 | 19 | 1 | 60 | Flows, good body. |
| 8 | 50 | 80 | 34 | 19 | 1 | 60 | Flows. |

*35.1% water soluble.

This series of compositions was made to learn the effect of using ammonium chloride and citric acid instead of sodium acetate and white tapioca. The compositions were prepared according to the procedure of Example XIV. Films of the compositions dried on glass gave a needle-like crystallization similar to those of Example XVII. Composition 8 gave a film showing small grain-like crystals after standing for a week. Strips of standard bond paper sealed with this series had good bonds.

*Example XXI*

The following compositions were prepared by mixing together the ingredients shown in the various columns listed below:

| | Chlorinated starch | White tapioca dextrin* | Urea | Corn sugar | Water | Citric acid | Characteristics of product, fluidity |
|---|---|---|---|---|---|---|---|
| 1 | 50 | 80 | 50 | 20 | 60 | 0 | Does not flow. |
| 2 | 50 | 80 | 50 | 10 | 60 | 0 | Flows. |
| 3 | 50 | 80 | 50 | 20 | 60 | 2 | Flows easily. |
| 4 | 50 | 80 | 50 | 20 | 60 | 1 | Do. |
| 5 | 50 | 80 | 34 | 20 | 60 | 1 | Does not flow. |
| 6 | 50 | 80 | 34 | 10 | 60 | 1 | Do. |

*35.1% water soluble.

These compositions were prepared by the procedure of Example XIV. Films dried on glass did not crystallize but had a tendency to be hygroscopic. Strips of standard bond paper sealed with compositions of this series and dried in a steam oven for 96 hours had a good bond. Films of the compositions made on bond paper and dried for 24 hours had a fair gloss.

*Example XXII*

The following compositions were prepared by mixing together the ingredients shown in the various columns listed below:

| | Chlorinated starch | White tapioca dextrin* | Urea | Cane sugar | Water |
|---|---|---|---|---|---|
| 1 | 50 | 80 | 50 | 20 | 60 |
| 2 | 50 | 80 | 50 | 10 | 60 |
| 3 | 50 | 80 | 34 | 20 | 60 |

*35.1% water soluble.

These compositions were prepared by the procedure of Example XIV. Compositions 1 and 2 did not flow. Composition 3 flowed immediately after it was made. However, on standing 24 hours it did not flow. Strips of bond paper sealed with compositions of this series and dried in a steam oven for 96 hours had a good bond. Films dried on glass did not crystallize.

*Example XXIII*

A composition was prepared by mixing together 40 parts of chlorinated starch, 80 parts of a 25% to 30% water soluble white corn dextrin, 50 parts of urea, 10 parts of calcium chloride and 60 parts of water, for 10 to 15 minutes, at room temperature. This composition was allowed to stand over night and was then tested. It showed good adhesive properties.

*Example XXIV*

A composition was prepared by mixing together 40 parts of chlorinated starch, 80 parts of white tapioca dextrin (35.1% water soluble), 50 parts of urea, 10 parts of corn sugar, 10 parts of calcium chloride, and 60 parts of water. This composition showed good adhesive properties, particularly for paper. It did not flow after standing a week. Films on glass did not crystallize.

It will be apparent that modifications may be made in the proportions of the various compositions and in the use of auxiliary agents in preparing them. The dextrins may be such as are derived from starches by the usual methods of conversion, for example, hydrolysis, oxidation, heat or enzymatic action. Examples of suitable dextrins are those derived from wheat, rye, barley, corn, oat, rice, maize and potato starches, and sago and cassava flours. The solubility or dispersibility of the dextrins in water at ordinary temperatures and pressures may vary within relatively wide limits but will usually be in excess of about 10% and preferably more than about 50%. According to one of the preferred embodiments of the invention, compositions are prepared in which the solubility of the dextrin is within the range of 85% to 100%. These compositions are especially useful as seal gums, for instance, in making seals for the flaps of paper envelopes where the composition is dried on the envelope in the form of a film which must be flexible so as not to check or crack and must have adhesive properties when moistened in order that the envelope may be sealed. In general, the preferred compositions contain a major proportion of a dextrin or mixture of dextrins. Where the composition contains starch, more water and more urea are normally required.

While the best results have been obtained in the use of urea per se, it will be understood that other ureas and particularly water soluble ureas having a similar action may be employed to replace urea wholly or in part. Hence the expression "a urea" is herein employed to cover substituted ureas, e. g., monomethylurea, monoethylurea, symmetrical dimethylurea and higher homologues, as well as analogues, e. g., thiourea, The proportion of urea is subject to variation depending largely upon the type of amylaceous substance. It may also vary with the quantity of water. With dextrin compositions, less urea is required than with starch compositions and with low soluble dextrins more urea is required than with highly soluble dextrins, the urea serving in this case to increase the solubility of the low soluble dextrins as well as to produce a more flexible film. If the composition contains a starch in substantial amounts, say 10% or more based upon the total weight of the amylaceous material, it is preferable to use a relatively large amount of urea, for instance 25% or more of urea based upon the total weight of starch or starch derivative and urea. The lower limit of the amount of urea in treating amylaceous substances containing starch is that amount which will produce a gelatinous product at ordinary temperatures, as distinguished from a hard solid which cannot be readily applied and cannot be readily flowed into films. If the amylaceous material is of a highly soluble dextrin nature and readily forms a homogeneous suspension in water at ordinary temperatures and pressures, the amount of urea may be much less but is usually preferably at least 5% based upon the amount of dextrin and urea. It will be observed that with dextrins the amount of water required to produce a homogeneous suspension is much less than with starches. Hence, the concentration of urea with respect to water may still be relatively high. The upper limit of the amount of the urea is that amount which may be added to the composition without crystallization out of solution; in other words, the upper limit is dependent upon the solubility of the urea in water.

The amount of water may vary somewhat, depending largely upon the nature and proportions of the ingredients. Less water is usually required with dextrins than with starches to produce a fluid consistency by cooking without urea. For instance, a dextrin may take up from about 0.5 part to 2.0 parts of water per part of dextrin; a so-called modified starch may be capable of taking up from 2 to 15 parts of water per part of starch; and an undegenerated starch may take up about 15 to 30 parts of water to each part of starch. Undegenerated starches and many modified starches, however, will not disperse or dissolve in water to any substantial extent, say, more than 5% at ordinary temperatures and pressures. In general, it is preferable to use as little water as possible to obtain the desired fluid and film-forming characteristics and to produce a colloidal dispersion or solution. In making envelope adhesives, it is generally preferable that the ratio of water to total amylaceous material and urea be within the range of about 1:4 to 1:1. In making adhesives for the seams of paper bags, it is preferable to use from 1 to 3.5 parts of water to 1 part total amylaceous substance and urea. In other cases even more water may be used.

If desired a base material may be prepared by merely mixing together the urea and amylaceous material in the dry state. This mixture when treated with water then forms an adhesive composition. Compositions prepared by merely mixing together the urea and amylaceous material are especially suitable for shipment as such. Instead of merely mixing the ingredients at ordinary temperatures and pressures, the urea and amylaceous substance may be heated together at a temperature above the melting point of urea and the resultant composition allowed to cool and then ground.

The mixing of the urea and amylaceous substance with water may be effected at ordinary temperatures. If desired, however, elevated temperatures may be used, for instance, within the range of 140° to 180° F. Higher or lower temperatures may be used but the temperatures should be below the temperature at which substantial decomposition of urea occurs. Atmospheric, subatmospheric or superatmospheric pressures may be employed.

It will be recognized that the time of mixing will vary, depending upon the size of the batch and the efficiency of the apparatus. Usually the mixing is effected until a homogeneous gelatinous product is obtained. For example, this may require mixing for 10 to 15 minutes and then allowing the product to stand over night.

The compositions consisting solely of amylaceous substance, urea and water may form films which are white or dull rather than glossy, apparently having a pattern due to the formation of urea crystals. This is not detrimental to the adhesive action of the film but where the film is applied to the open flap of envelopes to be sealed by the user, it is normally desirable that the adhesive surface present a glossy appearance. In preventing urea crystallization a number of water soluble compounds may be used, as illustrated by the salts and sugars disclosed in the examples. In general, it is preferable to include in the composition an alkli metal acetate, for example, sodium acetate or potassium acetate, or an acid phosphate, for example, sodium monophosphate. These preferred materials have the dual function of preventing the pattern effect (i. e., urea crystallization), and prolucing a glossy film. The amounts used are normally sufficient for that purpose, preferably corresponding to about 5% to 20% by weight of dry base (i. e., amylaceous substance and urea). Salts used as addition agents are preferably neutral, weakly alkaline, or weakly acidic. In general, the addition agents are preferably used in sufficient amounts to make the resultant composition slightly hygroscopic.

Other substances which may be added to the mixture of amylaceous material and urea, either before or after mixing with water, are auxiliary gelatinizing agents, wetting and dispersing agents, neutralizing agents, bleaching agents, fillers and pigments. The resultant mixture may contain one of such substances or any combination thereof. As examples of addition agents which appear to have a gelatinizing action may be mentioned resorcinol, chloral hydrate, sodium salicylate, calcium chloride, zinc chloride, magnesium chloride and potassium acetate. Examples of bleaching agents are sodium bisulfite and sodium hydrosulfite. These are especially desirable where the compositions are slightly dark in color. Fillers may be used to give body to the product. Examples are clay, bentonite and the like.

In applying the compositions of the invention for adhesive purposes, the composition may be spread on the surface of the material to be glued, for example, paper, at ordinary temperatures, and sealed; or heat and pressure may be used, for instance, by sealing together the surfaces with adhesive composition between them and drying by means of a current of air which may be hot or cold. Potentially adhesive surfaces may be formed by coating the surface of the paper or other material (e. g., cloth, wood, metal, fibrous sheet materials, and the like) with the composition and drying the coating. These surfaces are adhesive when moistened.

The compositions of the invention may be used in coating, impregnating, and sizing fibrous sheet materials, including all types of paper, cloth and similar materials. Likewise they may be used in coating wood, glass and metal in sheet form, e. g., cans. Good results are obtained in gluing varnished labels on cans with these compositions. They may also be used in making tight-wrapped boxes without warping. Compositions of the invention may also be used in oil proofing paper, paper board and similar materials and in treating wallpaper by applying a coating thereto.

The invention has the advantage of providing new and improved compositions which are cheaply and readily available and at the same time possess good adhesive strength. Firm adhesion is obtained with bond paper which is more difficult to seal than most papers. Furthermore, the adhesive compositions of this invention are cold water pastes. They may be prepared by mixing the ingredients at ordinary temperatures and may be applied at such temperatures.

Having thus described the invention, what I claim as new and desire to secure by Letters Patent of the United States is:

1. A substantially water-soluble adhesive composition of substantially improved adhesive and film forming properties containing a major proportion of a dextrinized starch conversion product as an adhesive base material, a minor proportion of urea in amounts from about 5% and upward by weight of said adhesive base material and urea and a minor proportion of a water-soluble, normally solid, weakly alkaline, slightly hygroscopic, normally crystalline material, said crystalline material being present in substantial amounts not exceeding about 20% by weight of the total amount of said adhesive base material and urea.

2. A substantially water-soluble adhesive composition of substantially improved adhesive and film forming properties containing a major proportion of a dextrinized starch conversion product as an adhesive base, a minor proportion of urea in amounts from about 5% and upward by weight of said adhesive base and urea and a minor proportion of a water-soluble, normally solid, substantially neutral, slightly hygroscopic, normally crystalline material, said crystalline material being present in substantial amounts not greater than about 20% by weight of the total amount of said adhesive base and urea.

3. A substantially water-soluble adhesive composition of substantially improved adhesive and film forming properties containing a major proportion of a dextrinized starch conversion product as an adhesive base, a minor proportion of urea in amounts from about 5% and upward by weight of said adhesive base and urea and a minor proportion of a water-soluble, normally solid, weakly acid, slightly hygroscopic, normally crystalline material, said crystalline material being present in substantial amounts not greater than about 20% based upon the total weight of said adhesive base and urea.

4. A substantially water-soluble adhesive composition of substantially improved adhesive and film forming properties containing a major proportion of a dextrinized starch conversion product as an adhesive base, a minor proportion of urea in amounts greater than about 5% by weight based upon the total amount of said adhesive base and urea and a minor proportion of a water-soluble, normally solid, slightly hygroscopic, normally crystalline material adapted to reduce the whitening and pattern effect of the urea and to clarify and impart gloss to dried films of said composition, said crystalline material being present in substantial amounts less than about 20% by weight of the total amount of said adhesive base and urea said ingredients being dispersed in water, the ratio of water to solids being within the range of about 1:4 to about 1:1.

5. A substantially water soluble adhesive composition of substantially improved adhesive and film forming properties containing a major proportion of a dextrinized starch conversion product as an adhesive base, a minor proportion of urea in amounts greater than about 5% by weight based upon the total amount of said adhesive base and urea and a minor proportion of a water-soluble, normally solid, slightly hygroscopic, normally crystalline material adapted to reduce the whitening and pattern effect of the urea and to clarify and impart gloss to dried films of said composition, said crystalline material being present in substantial amounts less than about 20% by weight of the total amount of said adhesive base and urea said ingredients being dispersed in water, the ratio of water to solids being within the range of about 1:1 to about 3.5:1.

6. A dry adhesive base composition adapted to form a gelatinous adhesive film-forming dispersion upon the addition of water, said composition containing a major proportion of a dextrinized starch conversion product as an adhesive base, a minor proportion of a urea in amounts from about 5% and upward based on the total weight of said adhesive base and urea and a minor proportion of a water-soluble, normally solid, slightly hygroscopic, normally crystalline material, said material being present in substantial amount not substantially greater than about 20% based upon the total weight of said adhesive base and urea.

7. An adhesive composition of substantially improved adhesive and film forming properties comprising a substantial quantity of a dextrinized starch conversion product as an adhesive base and a substantial quantity of a water soluble urea, said dextrinized starch conversion product forming the predominant adhesive and film forming component and said urea forming a minor proportion of said composition in quantities from about 5% and upward based upon the total weight of said dextrinized starch conversion product and urea.

8. A demoistening adhesive composition of substantially improved adhesive and film forming properties comprising a substantial quantity of a dextrinized starch conversion product as an adhesive base and a substantial quantity of a water soluble urea, said dextrinized starch conversion product forming the predominant adhesive and film forming component and said urea forming a minor proportion of the solids present in said composition in quantities from about 5% and upward based on the total weight of said starch conversion product and urea.

9. An adhesive composition of substantially improved adhesive and film forming properties comprising a substantial quantity of a dextrinized starch conversion product as an adhesive base, a substantial quantity of a water soluble urea in sufficient amount to increase the flexibility of dried films of said adhesive and a substantial quantity of a water soluble, normally solid, slightly hygroscopic, crystalline material adapted to inhibit the formation of pattern effects and to clarify and impart gloss to dried films of said adhesive composition, said dextrinized starch conversion product forming the predominant adhesive film forming component, the urea forming a minor proportion of said composition in quantities from about 5% and upward based upon the total weight of said starch conversion product and urea and said water soluble crystalline material being present in amounts not substantially greater than 20% by weight of the total amount of dextrinized starch conversion product and urea.

10. A dry adhesive base composition adapted to form a gelatinous adhesive film forming dispersion upon the addition of water, said composition containing a substantial quantity of a dextrinized starch conversion product as an adhesive base, and a water soluble urea in an amount greater than about 5% but in a minor proportion as compared with the amount of dextrinized starch conversion product.

11. An adhesive composition of substantially improved adhesive and film forming properties comprising a substantial quantity of a dextrinized starch conversion product which is predominantly starchy in nature as an adhesive base, and a substantial quantity of a water soluble urea in sufficient amounts to increase the flexibility of dried films of said adhesive, said dextrinized starch conversion product forming the predominant adhesive and film forming component and said urea forming a minor proportion of said composition in an amount greater than about 5% based on the total weight of said adhesive base and urea.

12. An adhesive composition of substantially improved adhesive and film forming properties comprising a substantial quantity of a dextrinized starch conversion product as an adhesive base and a substantial quantity of a water soluble urea, said dextrinized starch conversion product forming the predominant adhesive and film forming component and said urea forming a minor proportion of said composition in quantities from about 25% and upward based upon the total weight of said dextrinized starch conversion product and urea.

HANS F. BAUER.

CERTIFICATE OF CORRECTION.

Patent No. 2,215,847.　　　　　　　　　　　　　　　September 24, 1940.

HANS F. BAUER.

It is hereby certified that error appears in the printed specification of the above numbered patent requiring correction as follows: Page 1, first column, line 19, for "ar" read --are--; page 4, second column, line 3, for the word "gloss" read --glass--; page 7, second column, line 18, claim 8, for "demoistening" read --remoistening--; and that the said Letters Patent should be read with this correction therein that the same may conform to the record of the case in the Patent Office.

Signed and sealed this 12th day of November, A. D. 1940.

(Seal)　　　　　　　　　　　　　　　　　　　　　　　Henry Van Arsdale,
　　　　　　　　　　　　　　　　　　　　　　Acting Commissioner of Patents.